(12) United States Patent
Pettersson et al.

(10) Patent No.: US 11,563,370 B2
(45) Date of Patent: Jan. 24, 2023

(54) PROTECTION SCHEME FOR POWER CONVERTERS UTILIZING CASCADED BIPOLAR AND UNIPOLAR POWER SEMICONDUCTOR DEVICES

(71) Applicant: ABB Schweiz AG, Baden (CH)

(72) Inventors: Sami Pettersson, Dietikon (CH); Mario Schweizer, Rütihof (CH); Ki-Bum Park, Fislisbach (CH); Francisco Canales, Baden-Dättwil (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/009,135

(22) Filed: Sep. 1, 2020

(65) Prior Publication Data

US 2021/0119442 A1  Apr. 22, 2021

(30) Foreign Application Priority Data

Sep. 2, 2019  (EP) .................................... 19194929

(51) Int. Cl.
*H02M 1/32* (2007.01)
*H02M 7/483* (2007.01)
(Continued)

(52) U.S. Cl.
CPC ........... *H02M 1/32* (2013.01); *H02M 1/0095* (2021.05); *H02M 7/487* (2013.01);
(Continued)

(58) Field of Classification Search
CPC ................. H02M 1/0095; H02M 1/32; H02M 7/483–487
See application file for complete search history.

(56) References Cited

U.S. PATENT DOCUMENTS 10,784,857 B1 * 9/2020 Li ..................... B60R 16/033
2014/0009984 A1 * 1/2014 Takizawa ............... H02M 7/00
363/65

(Continued)

FOREIGN PATENT DOCUMENTS

| EP | 3188355 A1 | 7/2017 |
| GB | 2564700 A | 1/2019 |
| GB | 2564701 A | 1/2019 |

OTHER PUBLICATIONS

European Patent Office, Extended Search Report issued in corresponding Application No. 19194929.6, dated Feb. 26, 2020, 8 pp.

(Continued)

*Primary Examiner* — Fred E Finch, III
(74) *Attorney, Agent, or Firm* — Greenberg Traurig, LLP

(57) ABSTRACT

A protection circuit for a power converter with cascaded bipolar and/or unipolar semiconductors is provided. The protection circuit includes at least one comparator circuit which is adapted to monitor a voltage characteristic on a collector-emitter path of at least one semiconductor which is arranged in a polarity selection stage of the power converter and/or to monitor a voltage characteristic on at least one capacitor, which is arranged in the power converter. The at least one comparator circuit is further adapted to output an electrical signal, representing the voltage characteristic of the semiconductor and/or the at least one capacitor to at least one evaluation unit. The at least one evaluation unit is further adapted to evaluate the result from the at least one comparator circuit and to deactivate the semiconductors in case that the voltage characteristic of the semiconductors and/or the capacitors deviate from a predetermined threshold.

20 Claims, 7 Drawing Sheets

(51) Int. Cl.
     H02M 1/00      (2006.01)
     H02M 7/487     (2007.01)
(52) U.S. Cl.
     CPC ....... H02M 7/4835 (2021.05); H02M 7/4837 (2021.05); H02M 1/0009 (2021.05)

(56) References Cited

U.S. PATENT DOCUMENTS

| | | | | |
|---|---|---|---|---|
| 2014/0198533 A1* | 7/2014 | Bala | ................ | H02M 7/4837 363/16 |
| 2016/0252941 A1* | 9/2016 | Yuan | ................ | G06F 1/263 713/323 |
| 2017/0185130 A1* | 6/2017 | Zhang | ................ | G06F 1/324 |
| 2017/0294847 A1* | 10/2017 | Xie | ................ | H02M 1/36 |
| 2017/0310105 A1* | 10/2017 | Shen | ................ | G05B 15/02 |
| 2017/0373586 A1* | 12/2017 | Zhang | ................ | H02M 7/5395 |
| 2018/0097515 A1* | 4/2018 | Norling | ................ | H03K 17/0822 |
| 2018/0183228 A1* | 6/2018 | Huber | ................ | G01R 19/165 |
| 2019/0013743 A1* | 1/2019 | Zhang | ................ | H02M 7/5395 |
| 2019/0363644 A1* | 11/2019 | Li | ................ | H02M 7/49 |

OTHER PUBLICATIONS

Richardeau et al., "Failures-Tolerance and Remedial Strategies of a PWM Multicell Inverter," IEEE Transactions on Power Electronics, vol. 17, No. 6, Nov. 2002, pp. 905-912.

Sheng et al; "A Fault Detection and Protection Scheme for Three-Level DC-DC Converters Based on Monitoring Flying Capacitor Voltage"; IEEE Transactions on Power Electronics; Institute of Electrical and Electronics Engineers, US; vol. 27, No. 2; Feb. 2012; pp. 685-697.

European Examination Report, issued by the European Patent Office, regarding corresponding patent application Serial No. 19194929.6; dated Aug. 4, 2022; 7 pages.

* cited by examiner

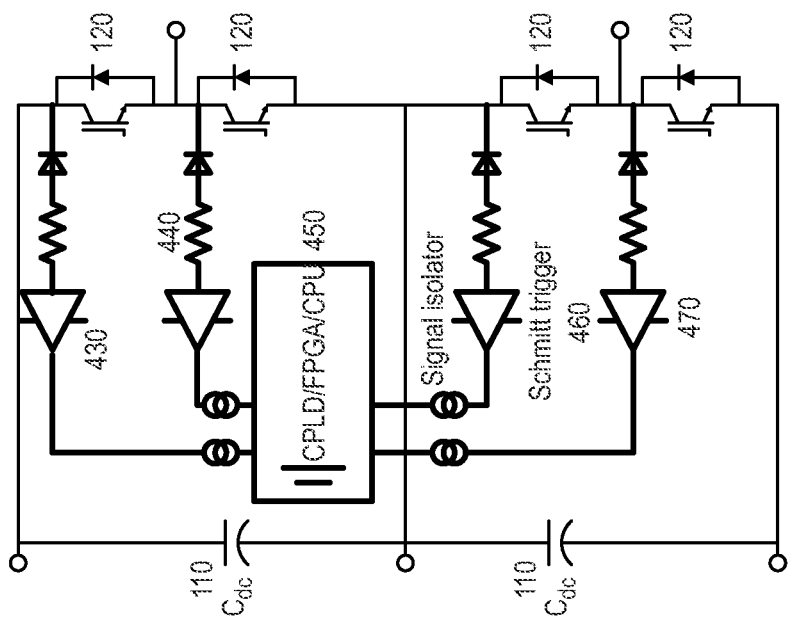
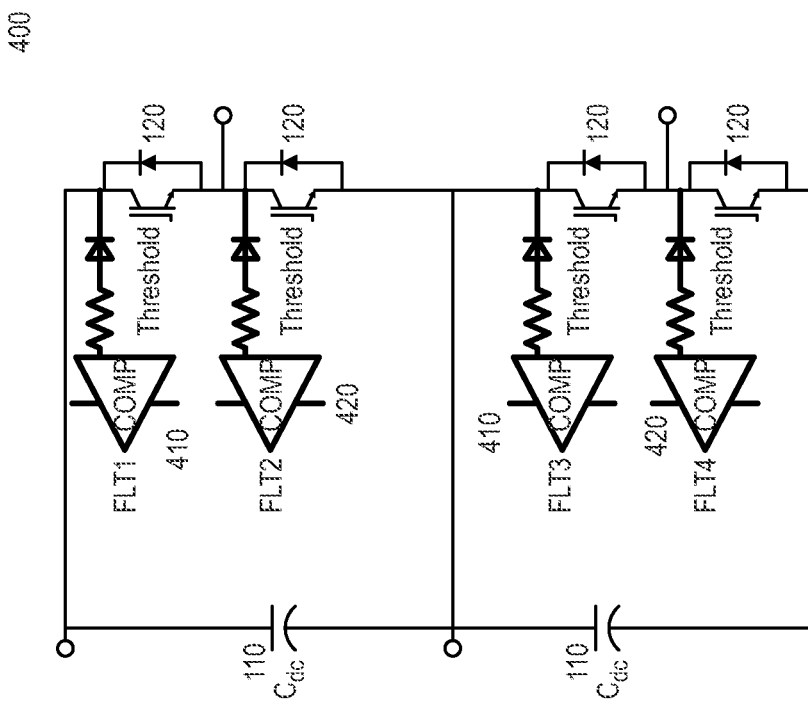
Fig. 4a
Fig. 4b

PROTECTION SCHEME FOR POWER CONVERTERS UTILIZING CASCADED BIPOLAR AND UNIPOLAR POWER SEMICONDUCTOR DEVICES

FIELD OF INVENTION

Embodiments of the present disclosure generally relate to the field of Multilevel Power Converters. The disclosure in particular relates to the field of multilevel power converters with cascaded semiconductors like flying capacitor converters or clamped converters like Active Neutral Point Clamped (ANPC) converters. A method and a circuit arrangement is disclosed in the embodiments for protecting all the semiconductor devices in the converters from excessive currents.

BACKGROUND OF INVENTION

Multilevel Power converters are used to convert electric energy from one form to another such as converting between AC and DC; or changing the voltage or frequency; or some combination of these.

Power MOSFETs are very advantageous for power electronic converters due to their fast switching capabilities and resistive conduction behavior. However, silicon based power MOSFETs generally suffer from limited voltage blocking capability. Moreover, the body diode has a poor dynamic performance. For this reason silicon, IGBTs have partly replaced them especially in industrial applications.

However, Silicon carbide (SiC) came as a viable material for power semiconductors like MOSFETs and provided an improvement for the two main drawbacks, namely the poor dynamic performance of the body diode and the limited voltage blocking capability. This made the MOSFET to an attractive device, also for industrial applications.

The SiC MOSFETs offer a comparable and even higher voltage blocking capability than state-of-the-art silicon based IGBTs, very low switching losses, bidirectional conduction capability with low conduction losses, and a body diode with good dynamic performance, which renders separate anti-parallel diodes unnecessary. However, the main disadvantage of the SiC MOSFETs is the poor short circuit capability.

Although the introduction of the SiC material has been a significant technical advancement for power MOSFETs in the recent years, the Silicon based power MOSFET technology has also taken some steps forward. Especially the considerably improved body diode reverse recovery performance of the fifth generation 100V and 150V MOSFETs has proven to be the key enabler for high performance. As a result, so-called flying capacitor (FC) converter topology has become very attractive when it comes to compact, light-weight, and high-efficient power converters for low-voltage applications.

Due to the low voltage rating of the individual device, the converter phase leg needs to be built with a large number of series-connected devices to enable connection to standard residential and industrial low-voltage distributions systems.

In the case of an FC converter topology, the total voltage blocking capability of a phase leg can be increased by increasing the number of the flying capacitor cells.

To limit the number of necessary MOSFETs and gate drivers (an FC cell may consist of four semiconductors and one capacitor), the FC converter can be combined with a polarity selector stage (PSS) which halves the input voltage of the FC converter. This may reduce the number of the FC cells. Because the polarity selector stage operates at fundamental frequency, IGBTs with a high voltage blocking capability can be used.

The large number of active semiconductor devices, isolated gate driver units, and gate voltage supplies make the FC converter topology more complex compared to conventional converter topologies. Typically, each active switch is individually protected against short circuits e.g. by a standard desaturation detection circuitry.

However, having an individual protection circuitry for each device when the total number of devices is in the range of several tens or even a couple of hundreds is neither practical nor cost-efficient.

Therefore, alternative protection methods are highly desired, which have a similar level and effectivity of protection than the current methods but are less expensive and do not need, e.g. one specific desaturation detection circuit per semiconductor.

SUMMARY OF INVENTION

In order to address the foregoing and other potential problems, embodiments of the present disclosure propose following aspects of the invention.

In a first aspect, protection circuits or protection strategies for a power converter with cascaded bipolar and/or unipolar semiconductors are disclosed. The protection circuit comprise at least one comparator circuit. The comparator circuit may be adapted to monitor a voltage characteristic measurable on a collector-emitter path of at least one semiconductor. The at least one semiconductor may be arranged in a polarity selection stage of the converter. The comparator circuit may also be adapted to monitor a voltage characteristic on at least one capacitor, also arranged in the power converter.

The at least one comparator circuit is further adapted to output an electrical signal to at least one evaluation unit. The signal may represent the voltage characteristic of the semiconductor and/or the at least one capacitor.

The at least one evaluation unit is further adapted to evaluate a result from the at least one comparator circuit and to deactivate the semiconductors in case that the voltage characteristic of the semiconductors and/or the capacitors deviate from a predetermined threshold.

In a second aspect, a method for protecting a power converter with cascaded bipolar and/or unipolar semiconductors is disclosed. The method comprises following steps:

With at least a first comparator circuit, a voltage characteristic on terminals of one or more semiconductors in the power converter is determined, and/or with at least a second comparator circuit, a voltage characteristic on terminals of one or more capacitors in the power converter is determined.

It is further evaluated, with one or more evaluation units, if the voltage characteristic on the terminals of one or more semiconductors and/or if the voltage characteristic on the terminals of the one or more capacitors in the power converter deviates from a predetermined threshold.

In another step, the semiconductors is deactivated, with a deactivating unit, in case said voltage characteristics deviate from predetermined thresholds. The semiconductors are deactivated to interrupt a possibly faulty current flow through the power converter.

In yet another aspect, a power converter with cascaded bipolar and/or unipolar semiconductors is disclosed. The power converter comprises a protection circuit or protection strategy according to one or more aspects which are presented in the present application.

BRIEF DESCRIPTION OF DRAWINGS

Embodiments of the present disclosure will be presented in the sense of examples and their advantages are explained in greater detail below, with reference to the accompanying drawings, wherein:

FIG. 4a shows a protection for semiconductors according to embodiments;

FIG. 4b shows another protection for semiconductors according to embodiments of the application;

DETAILED DESCRIPTION OF EMBODIMENTS

Figure 1:
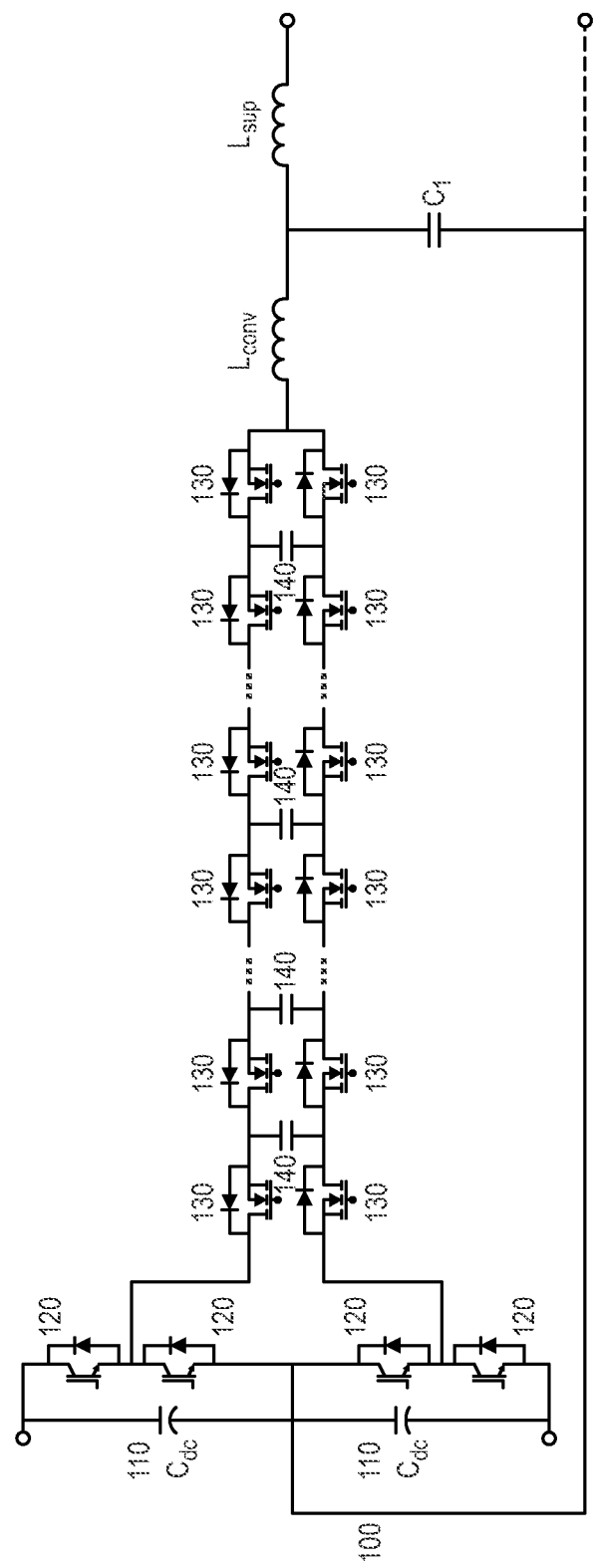
FIG. 1 shows a converter topology according to embodiments.

Hereinafter, aspects of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase may be intended to have a special meaning, i.e., a meaning other than that understood by skilled artisans, such a special definition will be expressly set forth in the specification in a definitional manner that directly and unequivocally provides the special definition for the term or phrase.

In the following, different variants for the solution described in the present application are disclosed.

FIG. 1 shows one phase leg of a power converter. The power converter in FIG. 1 is a converter according to the flying capacitor (FCC) concept. The FCC topology was developed in the 1990s, and it uses several floating capacitors instead of clamping diodes to share the voltage stress among devices and to achieve different voltage levels in the output. The FCC topology can be extended, achieving more levels in the output phase by the connection of more cells in tandem.

In FIG. 1, a polarity selector stage (PSS) formed of semiconductors 120 is arranged in the converter. The polarity selector stage halves the voltage input of the flying capacitor converter. With this measure, the number of FC cells needed is reduced. FC cells consist of semiconductors 130 and a capacitor (flying capacitor) 140. The semiconductors are operated complementarily.

FIG. 1 shows a multitude of connected flying capacitor cells, symbolized by three FC cells separated by dotted lines. The FC cells form one phase leg. The phase leg is connected to a filter circuit comprising a quadripole (T-Network), comprising two inductors ($L_{conv}$, $L_{sup}$) and one capacitor $C_1$. The quadripole serves as a filter circuit to "smooth" the output current, which has a sinusoidal shape in the ideal case.

For a three phase converter, three identical parallel phase legs as shown in FIG. 1, are necessary.

It can be seen that the FC converter technology employs a large number of active semiconductors, gate drivers and gate voltage supplies. Normally, each active semiconductor switch should be protected against short circuits, since in big installations high voltages and high currents are present. A common technology for monitoring and protecting the semiconductors is conventional standard desaturation detection circuitry.

This however makes multilevel converters, specifically the FC technology, very complex. Assigning an individual protection circuit for each semiconductor is not feasible, in particular when the total number of devices is in the range of several tens or hundreds of semiconductors is ineffective in view of cost efficiency or technical practice.

Therefore, a simpler alternative protection method has been developed and is disclosed and described in the following. In particular a protection circuit for a power converter 100 with cascaded bipolar and/or unipolar semiconductors 120, 130, is disclosed in a first embodiment of the present application.

The protection circuit may comprise at least one comparator circuit 210, 310, 410, 420, adapted to monitor a voltage characteristic on a collector-emitter path of at least one semiconductor 120 arranged in a polarity selection stage (PSS) of the converter 100 and/or to monitor a voltage characteristic on at least one capacitor 140 like e.g. a flying capacitor, arranged in the power converter 100.

The at least one comparator circuit 210, 310, 410, 420 may further be adapted to output an electrical signal, representing the voltage characteristic of the semiconductor 120 and/or the at least one capacitor 140 to at least one evaluation unit 220, 230, 320, 450, 520; wherein the at least one evaluation unit 220, 230, 320, 450, 520 may further be adapted to evaluate the result from the at least one comparator circuit 210, 310, 410, 420 and to deactivate the semiconductors 120 in case that the voltage characteristic of the semiconductors 120, 130 and/or the capacitors 140 deviate from a predetermined threshold.

As a phase current flows continuously through the polarity selection stage, the IGBTs can be utilized for overcurrent and/or short circuit protection. That is, excessive currents can be detected using e.g. a standard desaturation detection circuitry based on a collector-emitter voltage monitoring.

In such a case, the current flow from the main DC link to the FC converter stage is interrupted by turning off the IGBTs. If the switching frequency of the MOSFETs in the FC cells is high and therefore the capacitance of the flying capacitors small, the LV surface-mount MOSFETs are likely to withstand the energy stored in the flying capacitors and therefore no additional protection for the MOSFETs is necessary.

If this is not the case, the MOSFETs in the flying capacitor cells can be protected based on the flying capacitor cell voltage information. Even if no active cell voltage balancing is carried out, the cell voltages are typically measured for monitoring purposes. Thus, anomalies can be detected during operation based on sudden changes in the individual cell voltages, including flying capacitor cell voltage unbalances and over- and undervoltages, as well as MOSFETs failed in short or open circuit mode in the flying capacitor cells. A similar approach may be that a change rate of voltage is monitored to detect short circuits.

Both analog and digital implementations are possible for the above mentioned concepts. The cell voltages on the capacitors are measured differentially and the results are either digitized using an analog-to-digital converter (ADC) 220, 515 connected to e.g. an FPGA or a microcontroller as shown in FIG. 2a, or fed to an analog comparator with a pre-set threshold which triggers the fault state as shown in FIG. 2b.

Figure 2B:
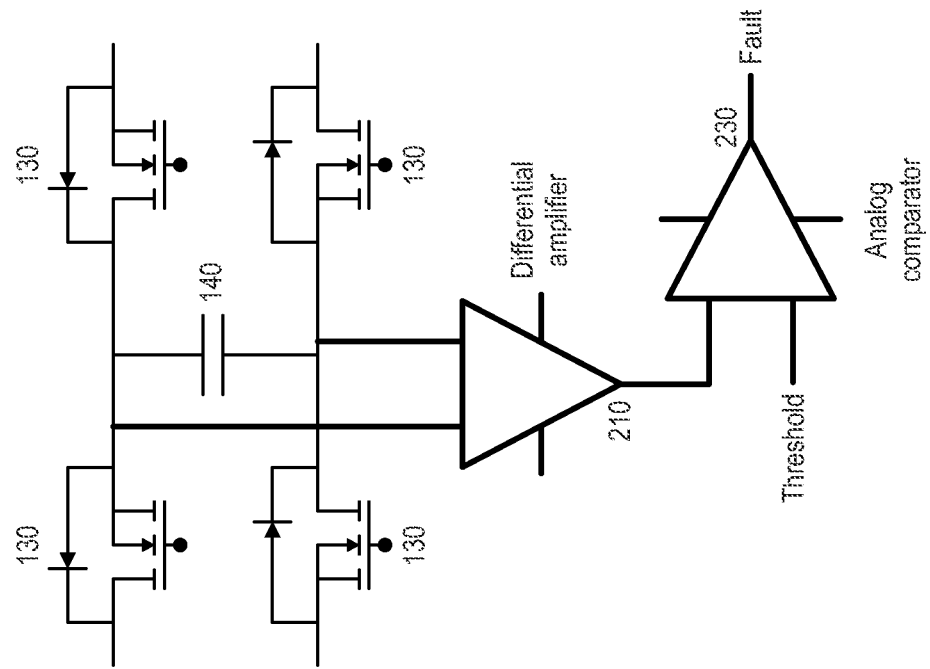
FIG. 2b shows another protection concept according to one or more embodiments.
Figure 2A:
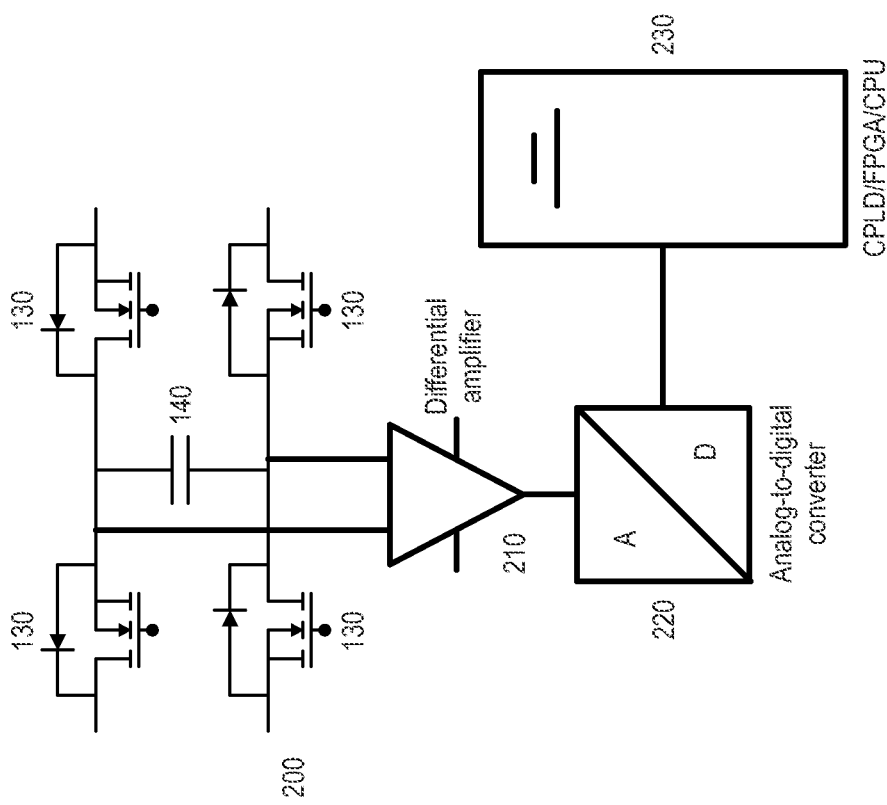
FIG. 2a shows a protection concept according to one or more embodiments.

FIG. 2a shows a flying capacitor (FC) cell. The cell may comprise semiconductors (MOSFETs) 130 and a capacitor 140 in a bridge like configuration. Two semiconductors 130 are respectively switched in a row, forming two branches. A capacitor 140 connects the two branches. A differential amplifier 210 having inputs. Two inputs are connected to first and second terminals of capacitor 140 as can be seen in FIG. 2a. The differential amplifier 210 having an output, connected to an input of an analog-to-digital converter 220, 515. The differential amplifier 210 evaluates a voltage behaviour of the capacitor 140 and feeds a signal of the evaluation to the A/D converter 220 which samples and digitizes the signal coming from the differential amplifier. The A/D converter 220 outputs a digital signal, comprising a behaviour of the voltage characteristic over the capacitor 140, to a calculation unit/FPGA/CPU 230 which is adapted to further analyse the signal from the A/D converter 220.

FIG. 2b shows a similar arrangement with the difference that the differential amplifier 210 outputs its signal to a first input of an analog comparator 230. A predetermined signal acting as a threshold value is input into a second input of the analog comparator 230. In case the predetermined threshold value deviates from the input value with the signal coming from differential amplifier 210, the analog comparator outputs forward signal which may then be used for further purposes.

The digital implementation enables more flexibility and use of advanced detection algorithms, but the analogue one may be more suitable for low-power and low-cost systems.

Operation of the FC stage may be monitored by the FPGA based on the cell voltage measurements which are digitized with the ADCs. Sudden changes in the cell voltages may indicate a possible abnormal operation, e.g. shorted MOSFETs causing draining of a flying capacitor 140, overvoltage on the grid side etc.

If the normally balanced cell voltages (the circuits needed for this cell balancings are not shown in the figures) become excessively unbalanced or exceed the pre-set overvoltage trip limit for some reason, the FPGA shuts down the modulation to protect the semiconductor devices.

Figure 3:
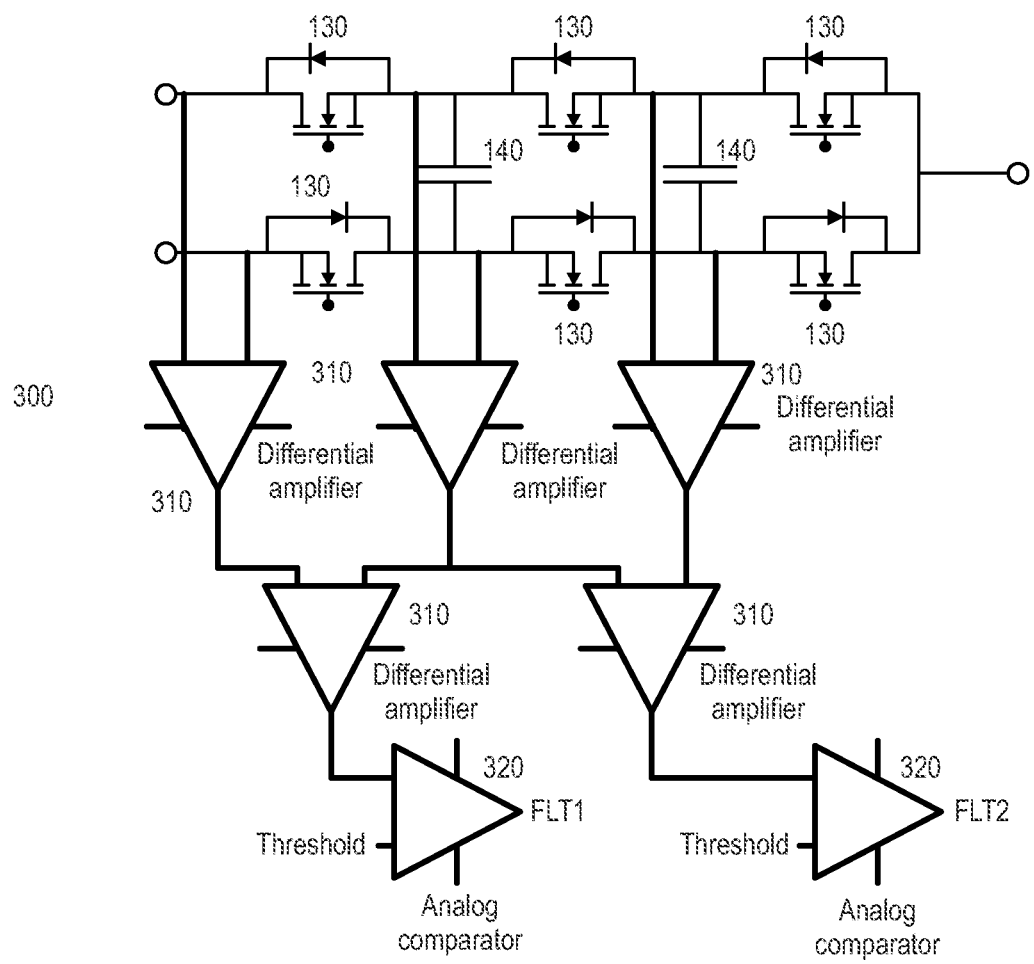
FIG. 3 shows an exemplary monitoring of voltage, used in embodiments.

An alternative method may be to monitor the voltage differences between adjacent cells as well as between the input and the first flying capacitor cell as can be seen in FIG. 3.

FIG. 3 shows an FC stage like it is shown in FIG. 2, except that it has six semiconductors 130 from which respectively three semiconductors are switched in a row. Two capacitors 140 are arranged in a bridge like manner between the two branches comprising three semiconductors 130. The capacitor voltages are monitored, as in FIG. 2, with a differential amplifier 310. Additionally, an input voltage of the phase leg may be also monitored with a differential amplifier 310. Output signals of the three differential amplifiers 310 serve as input signals for two following differential amplifiers 310. These two differential amplifiers 310 generate output signals. Each of these output signals may be input in another analog comparator 320. In the same manner as shown in FIG. 2, the signal coming from the differential amplifier 310 may be compared with a threshold value.

If the voltage difference is below a nominal, predetermined value in normal operation, there is a high probability of a failed device and e.g. a failure signal FLT1 or FLT2 may be generated.

Figure 5:
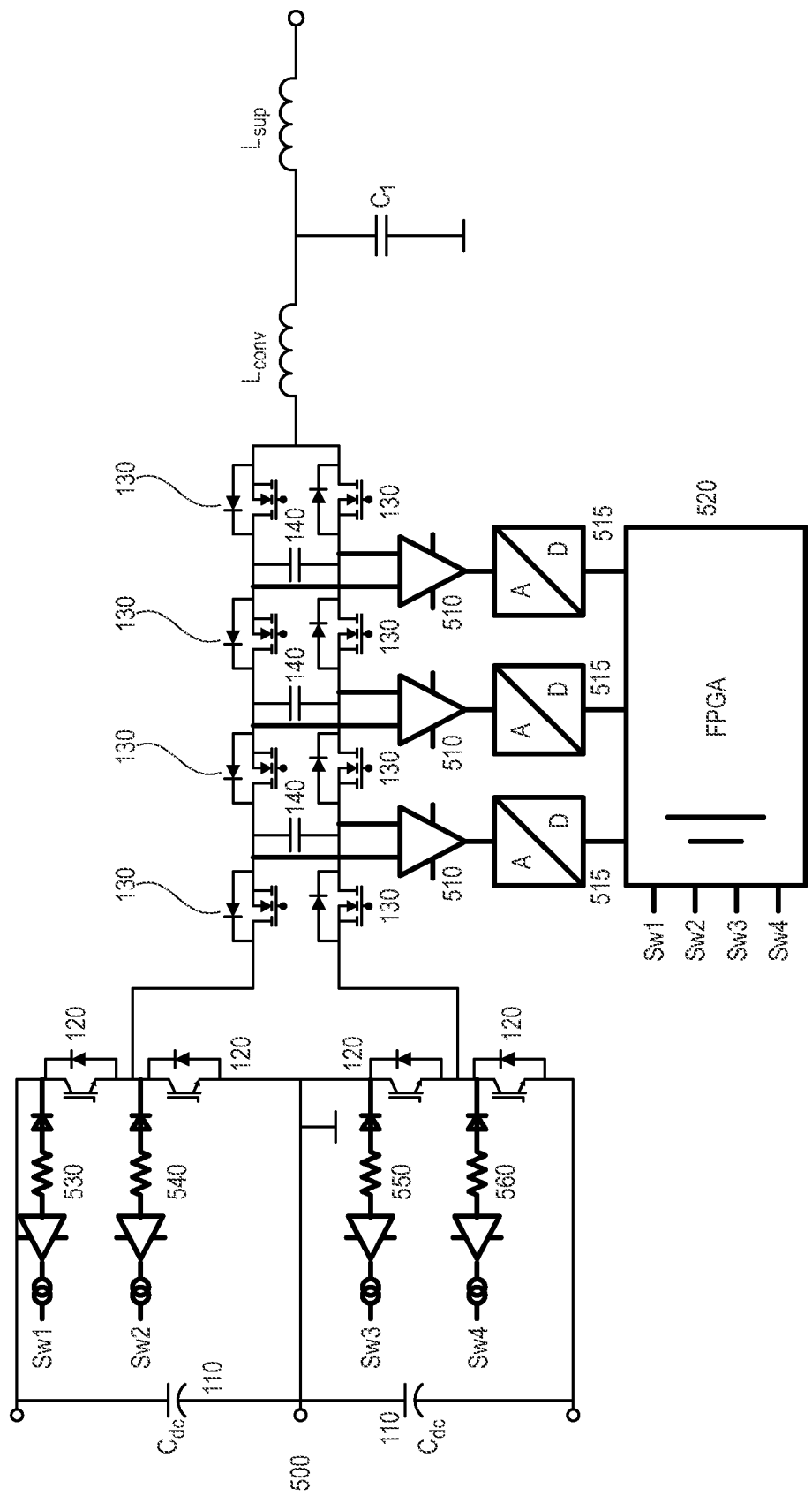
FIG. 5 shows a protection concept according to embodiments of the application.

The FPGA, known from FIG. 2, may additionally provide a gate control for the IGBTs (this is not shown in FIG. 5). The FPGA monitors the collector-emitter voltage of the IGBTs with the circuit consisting of a diode, a resistor and a Schmitt trigger. This logic signal may be used to detect desaturation by checking if the collector-emitter voltage drops fast enough after the IGBT is turned on. If the state of the logic signal does not change within a pre-defined time, this indicates a short circuit event. The circuit shown in FIG. 5 is simplified.

Another embodiment of the present application, according to other aspects of the application discloses that the at least one comparator circuit 210, 310, 410, 420 may comprise an arrangement of a Schmitt-Trigger, a diode and a resistor.

A circuit comprising a Schmitt trigger generates a status signal indicating the state of the IGBT based on the collector-emitter voltage, i.e. on or off (binary 1 or 0). The comparative operation may be carried out internally by the FPGA/CPU, which is time-based, and not voltage level-based as in the case of analog comparators.

Thus, in the case of a fault, the FPGA can directly shutdown the IGBTs via signal outputs. The fault trigger can originate from any source, e.g. from the FC stage voltage monitoring, the IGBT desaturation protection, etc. In addition to an FPGA, any logic circuit or a CPU with a fast input capture function can be used.

Figure 7:
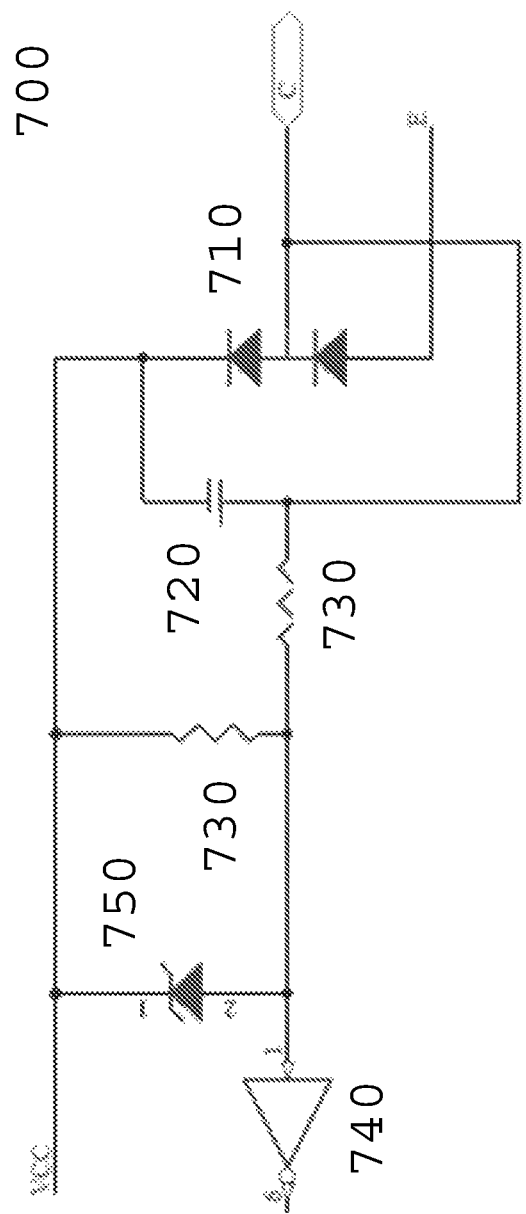
FIG. 7 shows an implementation of an electronic circuit.

A practical implementation 700 of a Schmitt trigger circuit 740 with some protection diodes (incl. a Zener diode 750), a filter capacitor 720, and a resistive voltage divider 730 to set a Schmitt trigger input voltage is shown in FIG. 7. Terminal C is the point which connects to the resistor in FIG. 5, terminal E is an IGBT emitter connection, and VCC a desired auxiliary voltage for the logic (e.g. 3.3 V) referenced to the emitter potential E.

Another embodiment of the present application, according to other aspects, discloses, that the at least one comparator circuit 210, 310, 410, 420 may comprise a differential amplifier. After the IGBT is turned on, the measured collector-emitter voltage may be compared in the differential amplifier to a pre-defined voltage level after a pre-defined time period to detect desaturation.

FIG. 4 shows two simplified implementation examples for collector-emitter voltage monitoring. The most common one is based on an analog comparator which triggers the fault state if the IGBT collector-emitter voltage does not drop below the pre-set threshold when the IGBT is turned on (FIG. 4a).

The IGBTs 120 are in the polarity selection stage. The four IGBTs 120 which are shown, are complementary switched. That means, the IGBTs can be activated only in specific configurations to avoid a short circuit of the DC link capacitors 110 which would destroy the IGBTs.

In the digital implementation presented in FIG. 4b, only information on the switching state of the IGBT may be provided and the decision on fault may be taken by the FPGA or microcontroller. Schmitt triggers have the purpose to form a digital signal from an analog signal by assigning a 0 or 1 two specific levels of the analog signal. Schmitt triggers and fast digital signal isolators guarantee a very small signal propagation delay.

In the case of the FC cell voltage monitoring, there is no functional difference between analog and digital implementation. In both cases, voltage levels are monitored and compared.

In a further embodiment of the protection circuit, according to one or more other aspects of the application, it is disclosed that the at least one evaluation unit 220, 230, 320, 450, 520 may comprise an FPGA and/or a processor based control unit. The FPGA and/or the processor based control unit may comprise I/O terminals to receive values, representing e.g. voltage or current values from the least one comparator circuit 210, 310, 410, 420, 510 and to output control signals to control an activation state of the semiconductors 120, 130.

In yet a further embodiment of the protection circuit according to one or more other aspects of the application, it is disclosed that the power converter may be a converter according to a flying capacitor type. The flying capacitor converter may comprise at least one cell At least one cell in the flying capacitor converter may comprise an arrangement of at least two semiconductors 130 and a capacitor 140.

In normal steady-state operation, the FC voltages should stay constant and balanced in respect to the direct voltage at the input of the FC stage. In the case of three FC cells, average voltages may be ¾, ½ and ¼ of the input voltage (voltage step=FC stage input voltage/(n+1), where n corresponds to the number of FC cells).

In case a full direct voltage is e.g. 1100 V, an output of the IGBT stage (PSS) is 550 V (each of the capacitors 110 in the PSS has half of the input voltage), which is also the input voltage of the FC stage. With the considerations from above, steady-state voltages of the FC cells are in an ideal case 412.5 V, 275 V and 137.5 V, starting from the cell closest to the DC input (left side).

The protection concept provided in the present application may also be used in a further embodiment of the protection circuit, according to one or more other aspects, with other converter topologies comprising cascaded bipolar and unipolar devices. Such a converter type may be a converter type according to an Active Neutral Point Clamped (ANPC) Converter type.

Figure 6:
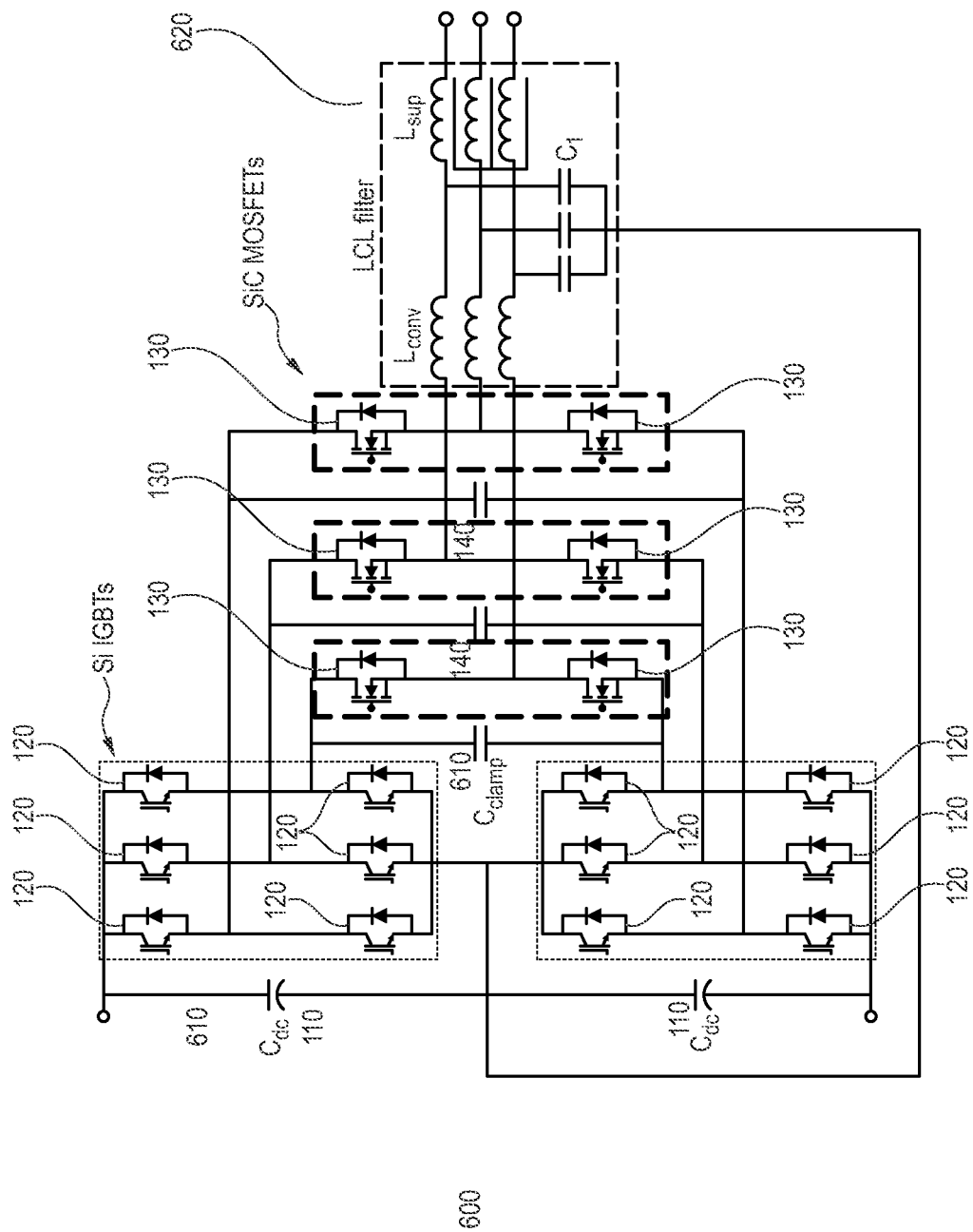
FIG. 6 shows a converter according to embodiments of the present application.

As an example, a 3-level hybrid Si/SiC active neutral point clamped (ANPC) converter consisting of silicon IGBTs and SiC MOSFETs is shown in FIG. 6. The converter in FIG. 3 is a bi-directional three phase converter, which can be used to supply a three phase grid with power from e.g. a DC source (e.g. a solar plant).

The IGBT 120 stage acts as polarity selector stage operating at the fundamental frequency, whereas the SiC MOSFETs are pulse width modulated at high frequency. In this case, the poor short circuit capability of SiC MOSFETs can be overcome by utilizing the saturation characteristics of the IGBTs to limit the short circuit current flowing through the SiC MOSFETs. Because the energy in the voltage clamping capacitors ($C_{clamp}$) 140 is typically not high enough to destroy the SiC MOSFETs in case of short circuit only, it is sufficient that the current flow from the main dc link is interrupted by turning off the IGBTs. Therefore, only the IGBT stage needs to be equipped with a short circuit detection circuitry, e.g. standard desaturation detection, which simplifies the gate driver unit design for the SiC MOSFETs. The semiconductors 130 may also be MOSFET or SiC MOSFET type transistors, in particular when the semiconductors are used in an FC cell or as a clamping capacitor in an active neutral point clamped (ANPC) converter.

As another embodiment of the present application, a method for protecting a power converter 100 with cascaded bipolar and/or unipolar semiconductors 120, 130 is disclosed. The method may comprise to determine, with at least a first comparator circuit 210, 310, 410, 420, a voltage characteristic on terminals of one or more semiconductors 120, 130 in the power converter and/or determining, with at least a second comparator circuit 210, 310, 410, 420, a voltage characteristic on terminals of one or more capacitors 140 in the power converter.

The method may further comprise to evaluate, with one or more evaluation units 220, 230, 320, 450, 520, if the voltage characteristic on the terminals of one or more semiconductors 120, 130 and/or if the voltage characteristic on the terminals of the one or more capacitors 140 in the power converter deviates from a predetermined threshold.

If such a deviation is detected, the method further comprises to deactivate, with a deactivating unit, the semiconductors 120. When said voltage characteristics deviate from predetermined thresholds, a current flow through the power converter to interrupt. That means in other words, the voltage characteristics in a steady or normal operation modus is known and serve as reference values to decide if a deactivation is necessary or not.

Some acceptable deviations e.g. in voltage or current may be stored as data in a memory of a controller which may control e.g. voltage behavior, rise time, fall time over the capacitors, current characteristic and other electrical values thereof from which a proper operation state can be derived. If perhaps, for any reason, a voltage, e.g. measured over the capacitors, does not fit such predetermined values, the semiconductors 120 are deactivated and a current flow is therefore interrupted.

In yet another embodiment of the method for protecting a power converter according to one or more other aspects, the at least one comparator circuit 210, 310, 410, 420 may comprise an arrangement of a Schmitt-Trigger, a diode and a resistor 530, 540, 550, 560.

Another embodiment of the method for protecting a power converter according to one or more aspects, the at least one comparator circuit 210, 310, 410, 420 may comprise at least one differential amplifier.

In yet a further embodiment of the method for protecting a power converter according to one or more aspects, it is disclosed that the at least one evaluation unit 220, 230, 320, 450, 520 may comprise an FPGA and/or a processor based control unit.

The FPGA and/or the processor based control unit may further comprise I/O terminals, adapted to receive values from the least one comparator circuit 210, 310, 410, 420.

The FPGA and/or the processor based control unit may further be adapted to output control signals to control an activation state of the semiconductors 120, 130. In other words, the FPGA and/or the processor based control unit may have the possibility to switch off (deactivate) the semiconductors 120, 130.

Yet a further embodiment is a multilevel power converter with cascaded bipolar and/or unipolar semiconductors 120, 130, comprising a protection circuit according to one or more aspects of the present applications.

Thus, a protection concept for multilevel converters comprising cascaded semiconductors is disclosed in the foregoing. The protection concept focuses mainly on a combination of a protection of IGBTs in a polarity selection stage of the converter. In addition, in case of a flying capacitor converter, monitoring characteristics of cell voltages and or voltage characteristics of the flying capacitors is also considered in the protection concept.

The IGBTs in the polarity selection stage (PSS), are monitored with e.g. desaturation control circuits. In case these desaturation control circuits signalise an IGBT becoming defective, the IGBTs in the polarity selection stage are switched off like a main fuse to protect the following converter stages. The IGBT 120 collector-emitter voltages are monitored to detect short circuits in the phase current path and to avoid shoot-through of the main dc energy storage in case of IGBT failure. The FPGA receives the instantaneous switching states of the IGBTs and checks that each device turns on properly when the gate voltage is applied. In case the collector-emitter voltage does not drop fast enough after the gate has been turned on, a short circuit fault is triggered and the modulation stopped.

However, a failure can also occur in the MOSFETs of the FC cells. In this case, monitoring voltages over the capacitors is an additional way to protect the converter. If there is an imbalance in the capacitor voltages, it can be concluded, that at least one of the MOSFETs in the cells has failed or is about to fail.

The circuit, monitoring the cell voltages, then also gives the command to switch off the IGBTs. This interrupts the current flow through the FC cells and therefore through the converter/converter leg.

In other words, in the previous embodiments there is proposed a protection concept for a full converter system consisting e.g. of a flying capacitor converter and a polarity selector stage. The protection concept is realised by combining two protection concepts previously presented. An example design in the case of a 9-level converter is presented in FIG. 5.

The same approach from FIG. 5 can be applied to the circuit in FIG. 6 to protect the SiC MOSFETs. The idea is the same, i.e. only the IGBTs need to be equipped with a desaturation protection circuit as the energy stored in the clamp capacitors of the SiC MOSFETs can be considered to be so small that it cannot destroy the MOSFETs in the case of a short circuit event. Therefore, it is sufficient to interrupt only the current flowing through the main DC link.

The invention claimed is:

1. A protection circuit for a power converter with cascaded bipolar semiconductors in a polarity selection stage and cascaded unipolar semiconductors in one or more flying capacitor cells, comprising:

at least one first comparator circuit adapted to monitor a voltage characteristic on a collector-emitter path of at least one of the cascaded bipolar semiconductors in the polarity selection stage of the converter and at least one second comparator circuit adapted to monitor a voltage characteristic on at least one flying capacitor arranged in the power converter;

the at least one first comparator circuit is further adapted to output an electrical signal representing the voltage characteristic of the at least one of the cascaded bipolar semiconductors in the polarity selection stage to at least one evaluation unit and the at least one second comparator circuit is further adapted to output an electrical signal, representing the voltage characteristic of the at least one flying capacitor to the at least one evaluation unit;

wherein the at least one evaluation unit is further adapted to evaluate the result from the at least one first and the at least one second comparator circuits and to deactivate the cascaded bipolar semiconductors in the polarity selection stage in case that the voltage characteristic of the cascaded bipolar semiconductors in the polarity selection stage or the flying capacitors deviate from a predetermined threshold.

2. The protection circuit according to claim 1, wherein the at least one first and at least one second comparator circuits comprise an arrangement of a Schmitt-Trigger, a diode, and a resistor.

3. The protection circuit according to claim 1, wherein the at least one first and at least one second comparator circuits comprise a differential amplifier.

4. The protection circuit according to claim 1, wherein the at least one evaluation unit comprises an FPGA and/or a processor-based control unit; wherein
the FPGA and/or the processor-based control unit comprise I/O terminals to receive values from the at least one first and at least one second comparator circuits and to output control signals to control an activation state of the cascaded bipolar semiconductors in the polarity selection stage.

5. The protection circuit according to claim 1, wherein the power converter is a converter according a flying capacitor type, wherein the flying-capacitor converter comprises at least one flying capacitor cell, the at least one flying capacitor cell comprising an arrangement of two cascaded unipolar semiconductors and a capacitor.

6. The protection circuit according to claim 1, wherein the power converter is a converter according to an Active Neutral Point Clamped (ANPC) Converter type.

7. The protection circuit according to claim 1, wherein the cascaded bipolar semiconductors in the polarity selection stage are IGBT type transistors.

8. The protection circuit according to claim 1, wherein the cascaded unipolar semiconductors are MOSFET or SiC MOSFET type transistors.

9. A power converter with cascaded bipolar semiconductors in a polarity section stage and cascaded unipolar semiconductors in one or more flying capacitor cells, comprising the protection circuit according to claim 1.

10. The power converter according to claim 9, wherein the at least one first and at least one second comparator circuits comprise an arrangement of a Schmitt-Trigger, a diode, and a resistor.

11. The power converter according to claim 9, wherein the at least one first and at least one second comparator circuits comprise a differential amplifier.

12. The power converter according to claim 9, wherein the at least one evaluation unit comprises an FPGA and/or a processor-based control unit; wherein
the FPGA and/or the processor-based control unit comprises I/O terminals to receive values from the at least one first and at least one second comparator circuits and to output control signals to control an activation state of the cascaded bipolar semiconductors in the polarity selection stage.

13. The power converter according to claim 9, wherein the power converter is a converter according a flying capacitor type, wherein the flying-capacitor converter comprises at least one cell, the at least one cell comprising an arrangement of two cascaded unipolar semiconductors and a capacitor.

14. The power converter according to claim 9, wherein the power converter is a converter according to an Active Neutral Point Clamped (ANPC) Converter type.

15. The power converter according to claim 9, wherein the cascaded bipolar semiconductors in the polarity selection stage are IGBT type transistors.

16. The power converter according to claim 9, wherein the semiconductors in the flying capacitor cells are MOSFET or SiC MOSFET type transistors.

17. A method for protecting a power converter with cascaded bipolar semiconductors in a polarity selection stage and cascaded unipolar semiconductors in one or more flying capacitor cells comprising:

determining, with at least one first comparator circuit, a voltage characteristic on terminals of the one or more cascaded bipolar semiconductors of a polarity selection stage in the power converter;

determining, with at least one second comparator circuit, a voltage characteristic on terminals of one or more flying capacitors in the power converter;

evaluating with one or more evaluation units, if the voltage characteristic on the terminals of the one or more cascaded bipolar semiconductors in the polarity selection stage and if the voltage characteristic on the terminals of the one or more flying capacitors in the power converter deviates from a predetermined threshold;

deactivating, with a deactivating unit, the cascaded bipolar semiconductors in the polarity selection stage, when said voltage characteristics deviate from predetermined thresholds to interrupt a current flow through the power converter.

18. The method according to claim 17, wherein the at least one first and at least second comparator circuits comprise an arrangement of a Schmitt-Trigger, a diode, and a resistor.

19. The method according to claim 17, wherein the at least one first and at least one second comparator circuits comprise at least one differential amplifier.

20. The method according to claim 17, wherein the at least one evaluation unit comprises an FPGA and/or a processor-based control unit;
wherein the FPGA and/or the processor-based control unit comprise I/O terminals to receive values from the comparator circuits and to output control signals to control an activation state of the cascaded bipolar semiconductors in the polarity selection stage.

* * * * *